(12) United States Patent
Tani (10) Patent No.: US 8,649,080 B2
(45) Date of Patent: Feb. 11, 2014

(54) TWO-DIMENSIONAL OPTICAL DEFLECTOR INCLUDING ONLY ONE PAIR OF MEANDER-TYPE PIEZOELECTRIC ACTUATORS AND ITS DRIVER

(75) Inventor: Masanao Tani, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 92 days.

(21) Appl. No.: 13/428,868

(22) Filed: Mar. 23, 2012

(65) Prior Publication Data

US 2012/0243064 A1 Sep. 27, 2012

(30) Foreign Application Priority Data

Mar. 24, 2011 (JP) .................. 2011-065578

(51) Int. Cl.
*G02B 26/08* (2006.01)
(52) U.S. Cl.
USPC .................. 359/224.1; 359/199.4; 359/200.8; 359/224.2
(58) Field of Classification Search
USPC .......... 359/199.1–199.4, 200.8, 214.1, 215.1, 359/223.1–226.1
See application file for complete search history.

(56) References Cited

U.S. PATENT DOCUMENTS

| | | | |
|---|---|---|---|
| 6,490,384 B2 * | 12/2002 | Yong | 385/17 |
| 2009/0237628 A1 * | 9/2009 | Furukawa et al. | 353/98 |
| 2011/0032590 A1 * | 2/2011 | Terada et al. | 359/199.4 |
| 2011/0292479 A1 | 12/2011 | Hiraoka et al. | |

FOREIGN PATENT DOCUMENTS

JP 2010-122480 A 6/2010

* cited by examiner

*Primary Examiner* — Frank Font
(74) *Attorney, Agent, or Firm* — Holtz, Holtz, Goodman & Chick, PC (57) ABSTRACT

In a two-dimensional optical deflector having a mirror and a support body surrounding the mirror, first and second piezoelectric actuators of a meander-type are provided opposite to each other with respect to a first axis of the mirror. Each of the first second piezoelectric actuators includes a plurality of piezoelectric cantilevers folded at every piezoelectric and connected from the support body to the mirror. Each of the piezoelectric cantilevers are in parallel with the first axis. Each of the piezoelectric cantilevers includes first and second piezoelectric cantilever elements in parallel with each other combined by a substrate. The second piezoelectric cantilever elements are divided into a first group of piezoelectric cantilever elements and a second group of piezoelectric cantilever elements alternating with the first group of piezoelectric cantilever elements.

10 Claims, 13 Drawing Sheets

TWO-DIMENSIONAL OPTICAL DEFLECTOR INCLUDING ONLY ONE PAIR OF MEANDER-TYPE PIEZOELECTRIC ACTUATORS AND ITS DRIVER

This application claims the priority benefit under 35 U.S.C. §119 to Japanese Patent Application No. JP2011-065578 filed on Mar. 24, 2011, which disclosure is hereby incorporated in its entirety by reference.

BACKGROUND

1. Field

The presently disclosed subject matter relates to a two-dimensional optical deflector and its driver.

2. Description of the Related Art

A prior art two-dimensional optical deflector is constructed by a mirror, a movable frame surrounding the mirror for supporting the mirror, a pair of meander-type inner piezoelectric actuators fixed between the movable frame and the mirror and serving as cantilevers for rocking the mirror with respect to an X-axis of the mirror, a support body surrounding the movable frame, and a pair of meander-type outer piezoelectric actuators fixed between the support body and the movable frame and serving as cantilevers for rocking the mirror through the movable frame with respect to a Y-axis of the mirror perpendicular to the X-axis (see: U.S. Patent Application Publication No. 2011/0292479A1 & JP2010-122480A).

Generally, in an optical scanner, the mirror is rocked with respect to the X-axis for a horizontal deflection at a high frequency, while the mirror is rocked with respect to the Y-axis for a vertical deflection at a low frequency.

In the described prior art two-dimensional optical deflector, since two pairs of meander-type piezoelectric actuators are required to carry out a two-dimensional deflection, the two-dimensional optical deflector would become large in size and cost.

SUMMARY

The presently disclosed subject matter seeks to solve the above-described problem.

According to the presently disclosed subject matter, in a three-dimensional optical deflector comprising a mirror and a support body surrounding the mirror, first and second piezoelectric actuators of a meander-type are provided opposite to each other with respect to a first axis of the mirror. Each of the first and second piezoelectric actuators comprises a plurality of piezoelectric cantilevers folded at every cantilever and connected from the support body to the mirror. Each of the piezoelectric cantilevers are in parallel with the first axis. Each of the piezoelectric cantilevers includes first and second piezoelectric cantilever elements in parallel with each other combined by a substrate. The second piezoelectric cantilever elements are divided into a first group of piezoelectric cantilever elements and a second group of piezoelectric cantilever elements alternating with the first group of piezoelectric cantilever elements.

The first piezoelectric cantilever elements of the first piezoelectric actuator and the first piezoelectric cantilever elements of the second piezoelectric actuator are configured to be driven by first and second drive voltages, respectively, opposite in phase with each other to rock the mirror with respect to the first axis. Also, the first groups of piezoelectric cantilever element and the second groups of piezoelectric cantilever elements are configured to be driven by third and fourth drive voltages, respectively, opposite in phase with each other to rock the mirror with respect to a second axis of the mirror perpendicular to the first axis.

According to the presently disclosed subject matter, since use is made of only one pair of meander-type piezoelectric actuators, the two-dimensional optical deflector would become small in size and cost.

A driver is provided to generate first and second drive voltages opposite in phase to each other and apply the first and second drive voltages to the first piezoelectric cantilever elements of the first piezoelectric actuator and the first piezoelectric cantilever elements of the second piezoelectric actuator, respectively, to rock the mirror with respect to the first axis. Also, the driver further generates third and fourth drive voltages opposite in phase to each other and applies the third and fourth drive voltages to the first groups of piezoelectric cantilever elements and the second groups of piezoelectric cantilever elements, respectively, to rock the mirror with respect to a second axis of the element perpendicular to the first axis.

Further, each of the piezoelectric cantilevers includes a third piezoelectric cantilever element combined by the substrate in parallel with the first and second piezoelectric cantilever elements, the third piezoelectric cantilever elements being configured to detect a deflection angle of the mirror.

The driver performs a feedback control using a deflection angle of the mirror from the third piezoelectric cantilever elements based upon amplitudes and frequencies of the first, second, third and fourth device voltages in such a way that the deflection angle is brought close to a predetermined value.

BRIEF DESCRIPTION OF THE DRAWINGS

The above and other advantages and features of the presently disclosed subject matter will be more apparent from the following description of certain embodiments, taken in conjunction with the accompanying drawings, wherein.

DETAILED DESCRIPTION OF EXEMPLARY EMBODIMENTS

Figure 1:
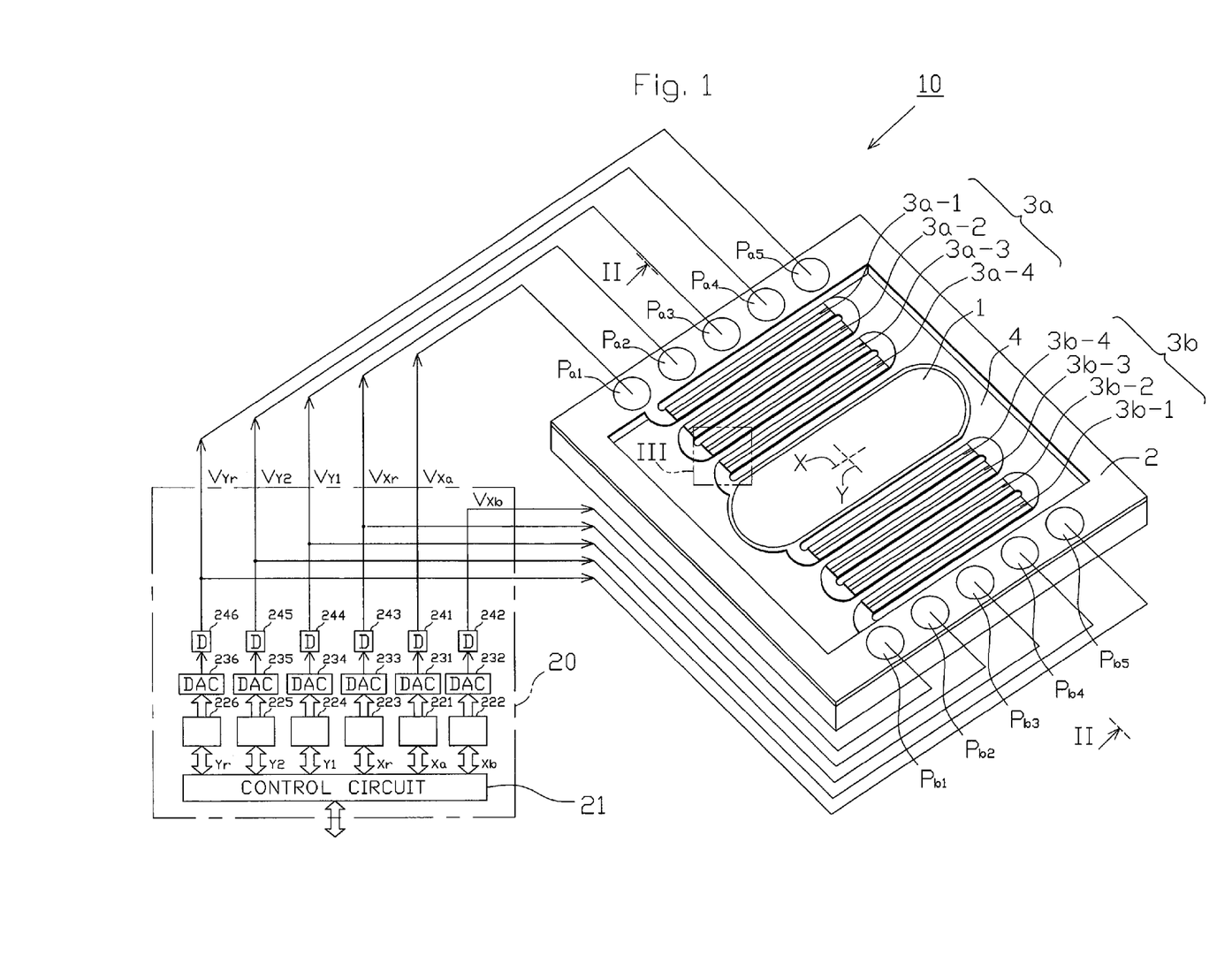
FIG. 1 is a view illustrating a first embodiment of the two-dimensional optical deflector according to the presently disclosed subject matter.

In FIG. 1, which illustrates a first embodiment of the two-dimensional optical deflector according to the presently disclosed subject matter, reference numeral 10 designates a two-dimensional optical deflector, and 20 designates a driver for driving the two-dimensional optical deflector 10.

The optical deflector 10 is constructed by an elongated-circular mirror 1 for reflecting an incident light, a support body 2 surrounding the mirror 1 for supporting the mirror 1, and a pair of meander-type piezoelectric actuators 3a and 3b fixed between the support body 2 and the mirror 1 and serving as cantilevers for rocking the mirror 1 with respect to both of an X-axis and a Y-axis of the mirror 1 perpendicular to each other. The piezoelectric actuators 3a and 3b are opposite to each other with respect to the mirror 1.

The support body 2 is rectangularly-framed to surround the mirror 1 associates with the piezoelectric actuators 3a and 3b.

The piezoelectric actuator 3a is constructed by piezoelectric cantilevers 3a-1, 3a-2, 3a-3 and 3a-4 which are serially-coupled from the support body 2 to the mirror 1. Also, each of the piezoelectric cantilevers 3a-1, 3a2, 3a-3 and 3a-4 are in parallel with the X-axis of the mirror 1. Therefore, the piezoelectric cantilevers 3a-1, 3a-2, 3a-3 and 3a-4 are folded at every cantilever or meandering from the support body 2 to the mirror 1, so that the amplitudes of the piezoelectric cantilevers 3a-1, 3a-2, 3a-3 and 3a-4 can be changed along directions perpendicular to the Y-axis of the mirror 1.

Similarly, the piezoelectric actuator 3b is constructed by piezoelectric cantilevers 3b-1, 3b-2, 3b-3 and 3b-4 which are serially-coupled from the support body 2 to the mirror 1. Therefore, the piezoelectric cantilevers 3b-1, 3b-2, 3b-3 and 3b-4 are in parallel with the X-axis of the mirror 1. Therefore the piezoelectric cantilevers 3b-1, 3b-2, 3b-3 and 3b-4 are folded at ever cantilever or meandering from the support body 2 to the mirror 1, so that the amplitudes of the piezoelectric cantilevers 3b-1, 3b-2, 3b-3 and 3b-4 can be changed along directions perpendicular to the Y-axis of the mirror 1.

Provided on the optical deflector 10 are pads $P_{a1}$, $P_{a2}$, $P_{a3}$, $P_{a4}$, $P_{a5}$, $P_{b1}$, $P_{b2}$, $P_{b3}$, $P_{b4}$ and $P_{b5}$ which are connected to the driver 20. In this case, the pads $P_{a1}$, $P_{a3}$, $P_{a4}$, $P_{b1}$, $P_{b3}$ and $P_{b4}$ are called upper electrode pads, and the pads $P_{a2}$, $P_{a5}$, $P_{b2}$ and $P_{b5}$ are called lower electrode pads.

The structure of each element of the optical deflector 10 is explained next with reference to FIGS. 2 and 3. Here, FIG. 2 is a cross-sectional view taken along the line II-II in FIG. 1, and FIG. 3 is an enlarged perspective view of a portion of FIG. 1 surrounded by the line III in FIG. 1.

Figure 2:
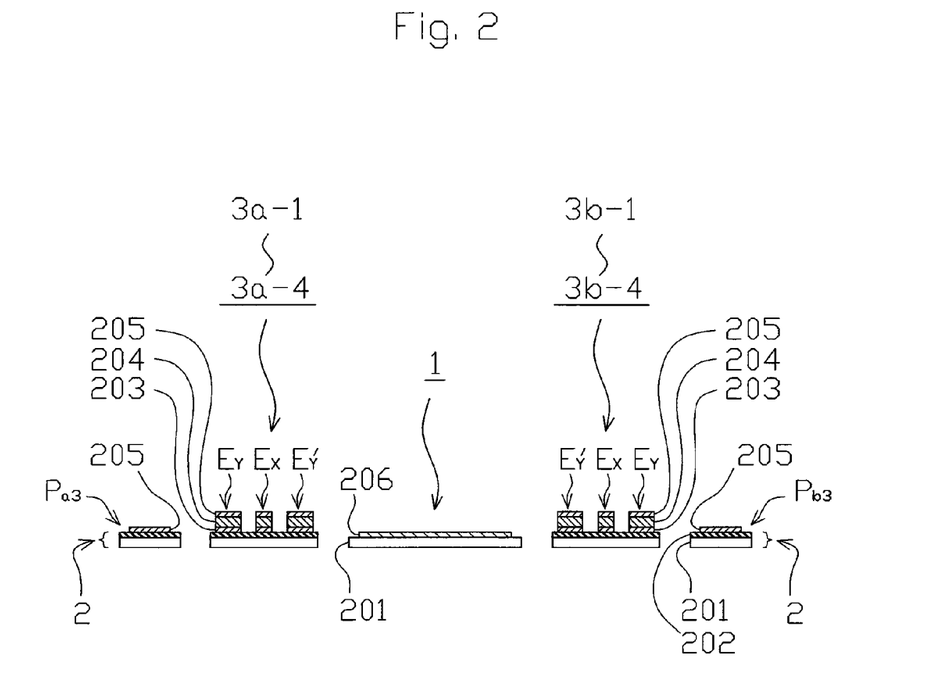
FIG. 2 is a cross-sectional view taken along the line II-II in FIG. 1.
Figure 3:
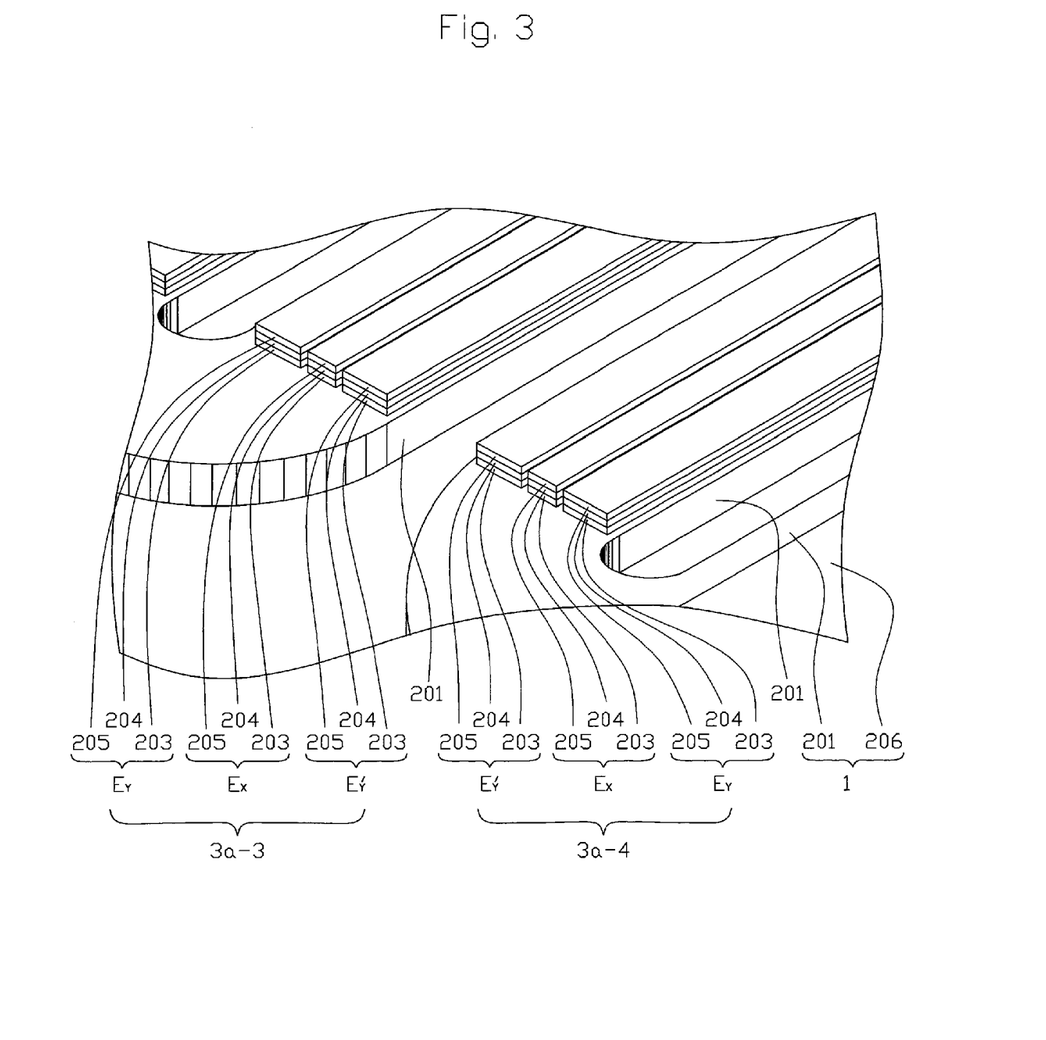
FIG. 3 is an enlarged perspective view of a portion surrounded by the line III in FIG. 1.

As illustrated in FIGS. 2 and 3, each of the piezoelectric cantilevers 3a-1, 3a-2, 3a-3, 3a-4, 3b-1, 3b-2, 3b-3 and 3b-4 is constructed by three piezoelectric cantilever elements $E_X$, $E_Y$ and $E_Y'$ in parallel with each other combined by a substrate.

In FIGS. 2 and 3, reference numeral 201 designates a monocrystalline silicon substrate. Note that the monocrystalline silicon substrate 201 can be formed by a silicon-on-insulator (SOI) substrate. Also reference numeral 202 designates a silicon oxide layer, 203 designates a lower electrode layer made of Ti, Pt, Au or the like, 204 designates a lead titanate zirconate (PZT) layer, 205 designates an upper electrode layer made of Pt, Au or the like, 206 designates an about 100 to 500 nm thick metal layer made of Al, Ag, Au or the like.

The mirror 1 is constructed by the monocrystalline silicon substrate 201 serving as a vibration plate and the metal layer 206 serving as a reflector.

The support body 2 is constructed by the monocrystalline silicon substrate 201 and the silicon oxide layer 202.

The piezoelectric cantilevers 3a-1, 3a-2, 3a-3, 3a-4, 3b-1, 3b-2, 3b-3 and 3b-4 are constructed by the monocrystalline silicon substrate 201, the silicon oxide layer 202, the lower electrode layer 203, the PZT layer 204 and the upper electrode layer 205. In more detail, each of the piezoelectric cantilevers 3a-1, 3a2, 3a-3, 3a4, 3b1, 3b-2, 3b-3 and 3b-4 is constructed by one piezoelectric cantilever element $E_X$ sandwiched by symmetrically-arranged piezoelectric cantilever elements $E_Y$ and $E_Y'$ in parallel with each other formed on the silicon oxide layer 202. In this case, the piezoelectric cantilever elements $E_X$, $E_Y$ and $E_Y'$ made of the lower electrode layer 203, the PZT layer 204 and the upper electrode layer 205 are separated from each other; however, the piezoelectric cantilever element $E_Y'$ performs the same function as the piezoelectric cantilever element $E_Y$. Therefore, the piezoelectric cantilever elements $E_Y$ and $E_Y'$ can be combined into one piezoelectric cantilever element.

Note that the silicon oxide layer 202 is omitted from FIG. 3, in order to simplify the description.

The upper electrode pads $P_{a1}$, $P_{a3}$, $P_{a4}$, $P_{b1}$, $P_{b3}$ and $P_{b4}$ are constructed by the upper electrode layer 205, and the lower electrode pads $P_{a2}$, $P_{a5}$, $P_{b2}$ and $P_{b5}$ are constructed by the lower electrode layer 203.

The upper electrode pad $P_{a1}$ is electrically connected to the upper electrode layers 205 of the piezoelectric cantilever elements $E_X$ of all the piezoelectric cantilevers 3a-1 to 3a-4, and the lower electrode pad $P_{a2}$ is electrically connected to the lower electrode layers 203 of the piezoelectric cantilever elements $E_X$ of all the piezoelectric cantilevers 3a-1 to 3a-4.

Also, the upper electrode pad $P_{a3}$ is electrically connected to the upper electrode layers 205 of the piezoelectric cantilever elements $E_Y$ and $E_Y'$ of the odd-numbered piezoelectric cantilevers 3a-1 and 3a-3, and the upper electrode pad $P_{a4}$ is electrically connected to the upper electrode layers 205 of the piezoelectric cantilever elements $E_Y$ and $E_Y'$ of the even-numbered piezoelectric cantilevers 3a-2 and 3a-4. Also, the lower electrode pad $P_{a5}$ is electrically connected to the lower electrode layers 203 of the piezoelectric cantilever elements $E_Y$ and $E_Y'$ of all the piezoelectric cantilevers 3a-1, 3a-2, 3a-3 and 3a-4. That is, the lower electrode pad $P_{a5}$ is common for the upper electrode pads $P_{a3}$ and $P_{a4}$.

Similarly, the upper electrode pad $P_{b1}$ is electrically connected to the upper electrode layers 205 of the piezoelectric cantilever elements $E_X$ of all the piezoelectric cantilevers 3b-1 to 3b4, and the lower electrode pad $P_{b2}$ is electrically connected to the lower electrode layers 203 of the piezoelectric cantilever elements $E_X$ of all the piezoelectric cantilevers 3b-1 to 3b-4.

Also, the upper electrode pad $P_{b3}$ is electrically connected to the upper electrode layers 205 of the piezoelectric cantilever elements $E_Y$ and $E_Y'$ of the odd-numbered piezoelectric cantilevers 3b-1 and 3b-3, and the upper electrode pad $P_{b4}$ is electrically connected to the upper electrode layers 205 of the piezoelectric cantilever elements $E_Y$ and $E_Y'$ of the even-numbered piezoelectric cantilevers 3b-2 and 3b-4. Also, the lower electrode pad $P_{b5}$ is electrically connected to the lower electrode layers 203 of the piezoelectric cantilever elements $E_Y$ and $E_Y'$ of all the piezoelectric cantilevers 3b-1, 3b-2, 3b-3 and 3b-4. That is, the lower electrode pad $P_{b5}$ is common for the upper electrode pads $P_{b3}$ and $P_{b4}$.

The mirror 1, the support body 2, the piezoelectric actuators 3a and 3b, and the pads $P_{a1}, P_{a2}, \ldots, P_{b5}$ are based upon the monocrystalline silicon substrate 201 (or the SOI substrate), and therefore, the mirror 1, the support body 2, the piezoelectric actuators 3a and 3b, and the pads $P_{a1}, P_{a2}, \ldots, P_{b5}$ can be formed by a semiconductor manufacturing process such as photolithography processes, etching processes and micro electro mechanical systems (MEMS) processes.

Also, a space 4 is provided between the mirror 1 and the support body 2, so that the mirror 1 can be rocked within the space 4 at a predetermined angle.

Returning to FIG. 1, the driver 20 is constructed by a control circuit 21 such as a microcomputer including a central processing unit (CPU), a read-only memory (ROM), a random access memory (RAM), an input/output (I/O) interface and the like.

The driver 20 further includes a nonvolatile memory 221 for storing drive data Xa for driving the upper electrode layers 205 of the piezoelectric cantilever elements $E_X$ of the piezoelectric cantilevers 3a-1 to 3a-4, a digital-to-analog converter (DAC) 231 for converting the drive data Xa into a drive voltage $V_{Xa}$, and a drive circuit 241 for applying the drive voltage $V_{Xa}$ to the pad $P_{a1}$.

The driver 20 further includes a nonvolatile memory 222 for storing drive data Xb for driving the upper electrode layers 205 of the piezoelectric cantilever elements $E_X$ of the piezoelectric cantilevers 3b-1 to 3b-4, a digital-to-analog converter (DAC) 232 for converting the drive data Xb into a drive voltage $V_{Xb}$, and a drive circuit 242 for applying the drive voltage $V_{Xb}$ to the pad $P_{b1}$.

The driver 20 further includes a nonvolatile memory 223 for storing drive data Xr for driving the lower electrode layers 203 of the piezoelectric actuators 4a-1, 4a-2, 4b-1 and 4b-2, a digital-to-analog converter (DAC) 233 for converting the reference data Xr into a reference voltage $V_{Xr}$, and a drive circuit 243 for applying the reference voltage $V_{Xr}$ to the pads $P_{a2}$ and $P_{b2}$.

The driver 20 further includes a nonvolatile memory 224 for storing drive data Y1 for driving the upper electrode layers 205 of the piezoelectric cantilever elements $E_Y$ and $E_Y'$ of the odd-numbered piezoelectric cantilevers 3a-1 to 3a-3, 3b-1 and 3b-3, a digital-to-analog converter (DAC) 234 for converting the drive data Y1 into a drive voltage $V_{Y1}$, and a drive circuit 244 for applying the drive voltage $V_{Y1}$ to the pads $P_{a3}$ and $P_{b3}$.

The driver 20 further includes a nonvolatile memory 225 for storing drive data Y2 for driving the upper electrode layers 205 of the piezoelectric cantilever elements $E_Y$ and $E_Y'$ of the even-numbered piezoelectric cantilever 3a-2 to 3a-4, 3b-2 and 3b-4, a digital-to-analog converter (DAC) 235 for converting the drive data Y2 into a drive voltage $V_{Y2}$, and a drive circuit 245 for applying the drive voltage $V_{Y2}$ to the pad $P_{a4}$ and $P_{b4}$.

The driver 20 further includes a nonvolatile memory 226 for storing reference data Yr for driving the lower electrode layers 203 of the piezoelectric cantilever elements $E_Y$ and $E_Y'$ of the piezoelectric cantilevers 3a-1 to 3a-2, 3a-3, 3a-4, 3b-1, 3b-2, 3b-3 and 3b-4, a digital-to-analog converter (DAC) 236 for converting the reference data Yr into a reference voltage $V_{Yr}$, and a drive circuit 246 for applying the reference voltage $V_{Yr}$ to the pads $P_{a5}$ and $P_{b5}$.

Note that the number of the piezoelectric cantilevers 3a-1, 3a-2, 3a-3 and 3a-4 and the number of the piezoelectric cantilevers 3b-1, 3b-2, 3b-3 and 3b-4 can be other values such as 2, 6, 8 . . . .

First, an optical deflection or horizontal scanning operation by rocking the mirror 1 with respect to the X-axis is explained below.

Figure 4A:
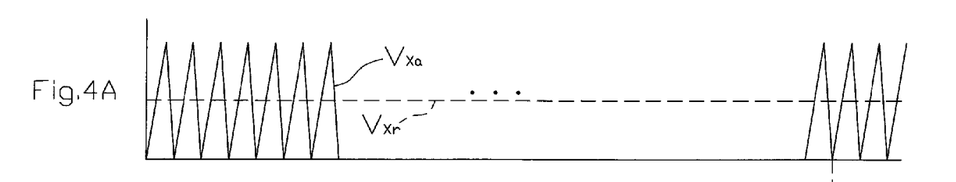
FIGS. 4A, 4B, 4C and 4D are timing diagrams for illustrating examples of the drive voltages $V_{Xa}$, $V_{Xb}$, $V_{Y1}$ and $V_{Y2}$ of FIG. 1.
Figure 4B:
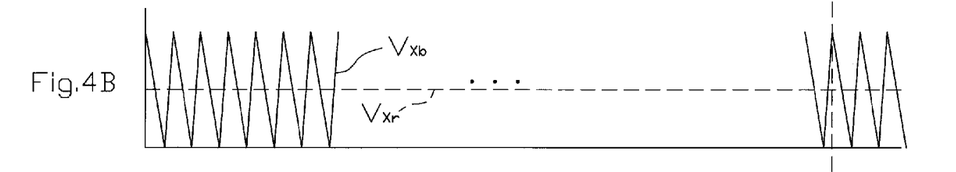
Figure 4C:
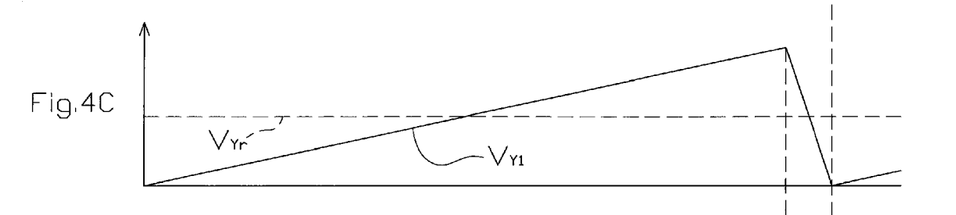
Figure 5:
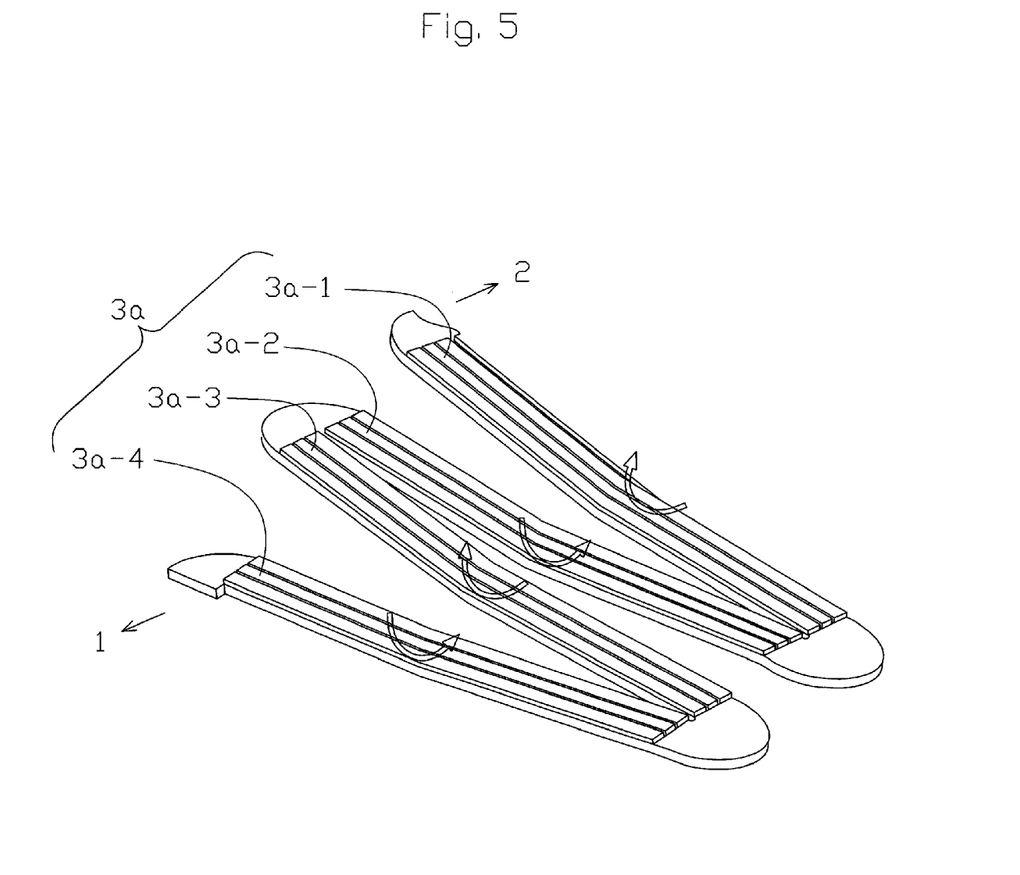
FIG. 5 is a perspective view for explaining a first example of the operation of the piezoelectric cantilevers of FIG. 1.

That is, the drive voltage $V_{Xa}$ based upon the drive data Xa stored in advance in the nonvolatile memory 221 as illustrated in FIG. 4A and the drive voltage $V_{Xb}$ based upon the drive data Xb stored in advance in the nonvolatile memory 222 as illustrated in FIG. 4B are AC voltages, i.e., saw-tooth or sinusoidal at a predetermined frequency $f_X$ such as 2.1 kHz and symmetrical opposite in phase to each other with the reference voltage $V_{Xr}$ based upon the reference data Xr stored in advance in the nonvolatile memory 223. When the drive voltage $V_{Xa}$ is applied to the upper electrode layers 205 of the piezoelectric cantilever elements $E_X$ of all the piezoelectric cantilevers 3a-1 to 3a-4, while the reference voltage $V_{Xr}$ is applied to the lower electrode layers 203 of the piezoelectric cantilever elements $E_X$ of all the piezoelectric cantilevers 3a-1 to 3a-4, each of the piezoelectric cantilevers 3a-1 to 3a-4 is flexed in one direction, for example, in an upward direction as illustrated in FIG. 5. In more detail, the piezoelectric cantilever 3a-1 is flexed in the upward direction with respect to the support body 2. Also, the piezoelectric cantilever 3a-2 is flexed in the upward direction with respect to the piezoelectric cantilever 3a-1. Further, the piezoelectric cantilever 3a-3 is flexed in the upward direction with respect to the piezoelectric cantilever 3a-2. Still further, the piezoelectric cantilever 3a-4 is flexed in the upward direction with respect to the piezoelectric cantilever 3a-3. Thus, the piezoelectric actuator 3a is entirely flexed in the upward direction.

On the other hand, when the drive voltage $V_{Xb}$ is applied to the upper electrode layers 205 of the piezoelectric cantilever elements $E_X$ of all the piezoelectric cantilevers 3b-1 to 3b-4, while the reference voltage $V_{Xr}$ is applied to the lower electrode layers 203 of the piezoelectric cantilever elements $E_X$ of all the piezoelectric cantilevers 3b-1 to 3b-4, each of the piezoelectric cantilevers 3a-1 to 3a-4 is flexed in a downward direction. Thus, the piezoelectric actuator 3b is entirely flexed in the downward direction.

Figure 6A:
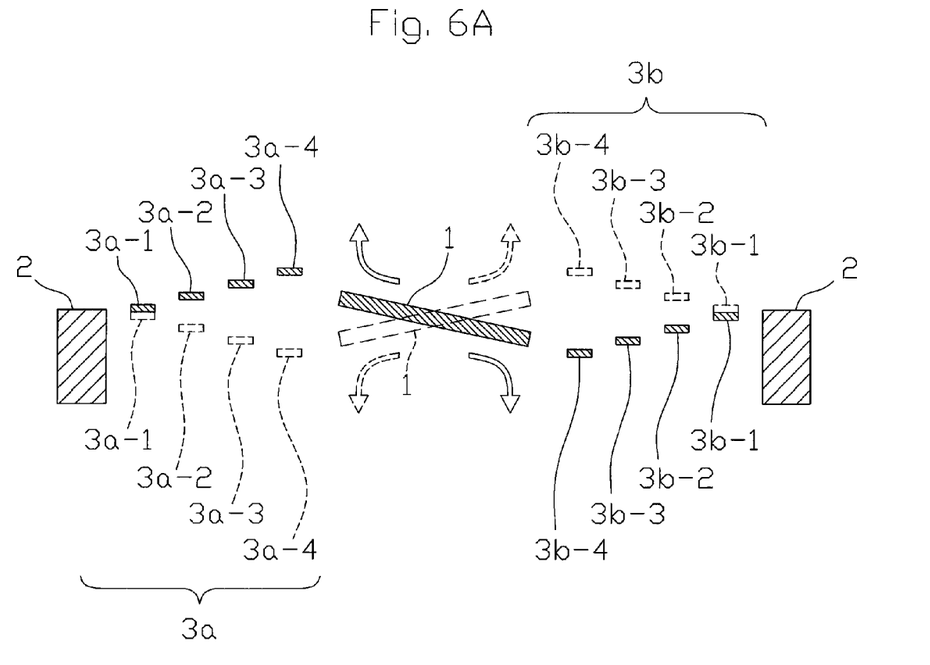
FIGS. 6A and 6B are a cross-sectional view and a perspective view, respectively, for explaining the rocking operation of the piezoelectric actuators along the X-axis of FIG. 1.
Figure 6B:
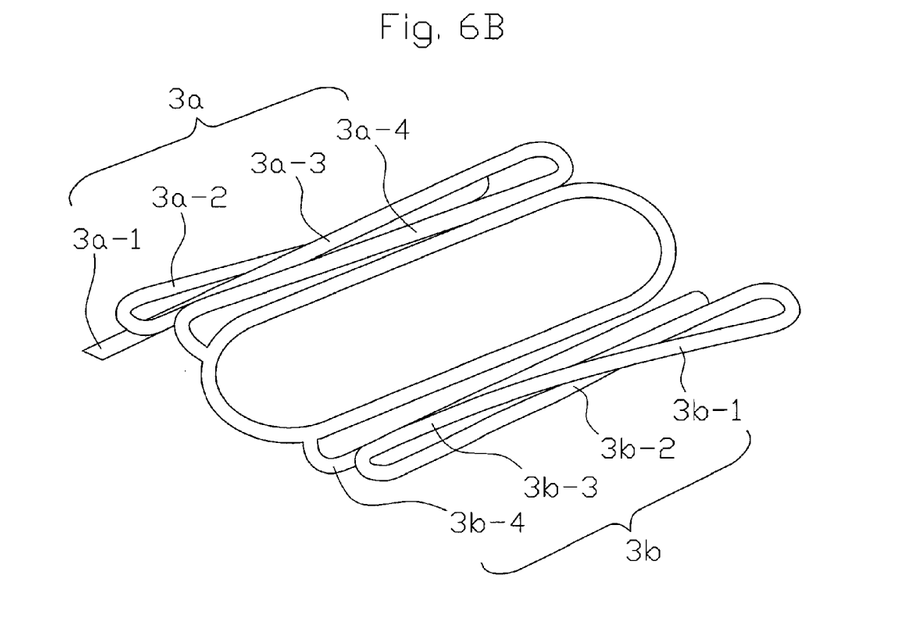

As illustrated in FIGS. 6A and 6B, when the piezoelectric actuator 3a is flexed in the upward direction and the piezoelectric actuator 3b is flexed in the downward direction, the mirror 1 is rocked in the clockwise direction with respect to the X-axis.

Note that, when the piezoelectric actuator 3a is flexed in the downward direction and the piezoelectric actuator 3b is flexed in the upward direction, the mirror 1 is rocked in a counterclockwise direction with respect to the X-axis, as indicated by a dotted line in FIG. 6A.

Next, an optical deflection or vertical scanning operation by rocking the mirror 1 with respect to the Y-axis is explained below.

Figure 4D:
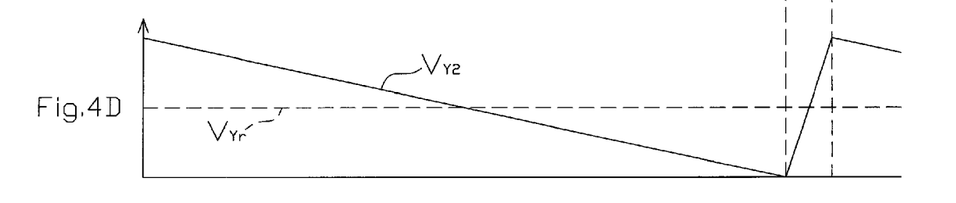
Figure 7:
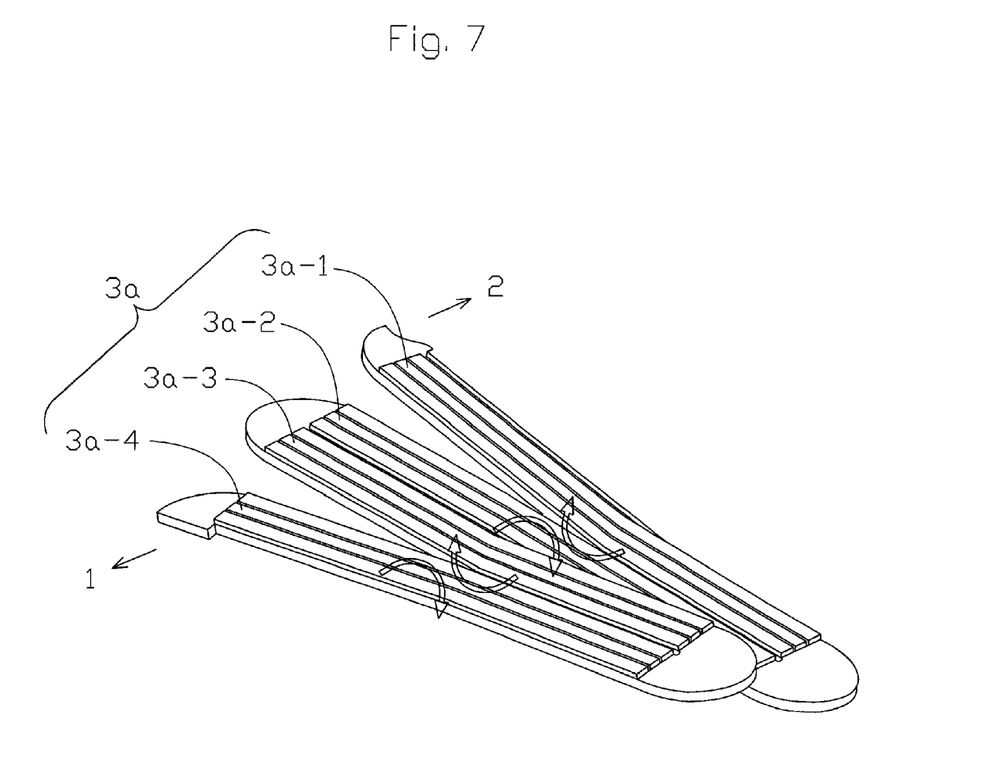
FIG. 7 is a perspective view for explaining a second example of the operation of the piezoelectric cantilevers of FIG. 1.

That is, the drive voltage $V_{Y1}$ based upon the drive data Y2 stored in advance in the nonvolatile memory 225 as illustrated in FIG. 4D are AC voltages, i.e., saw-tooth or sinusoidal at a predetermined frequency $f_Y$ such as 60 Hz and symmetrical or opposite in phase to each other with the reference voltage $V_{Yr}$ based upon the reference data Yr stored in advance in the nonvolatile memory 226. When the drive voltage $V_{Y1}$ is applied to the upper electrode layers 205 of the piezoelectric cantilever elements $E_Y$ and $E_Y'$ of the odd-numbered piezoelectric cantilevers 3a-1 and 3a-3; 3b-1 and 3b-3, and the drive voltage $V_{Y2}$ is applied to the upper electrode layers 205 of the piezoelectric cantilever elements $E_Y$ and $E_Y'$ of the even-numbered piezoelectric cantilevers 3a-2 and 3a-4; 3b-2 and 3b-4, while the reference voltage $V_{Yr}$ is applied to the lower electrode layers 203 of the piezoelectric cantilever elements $E_Y$ and $E_Y'$ of all the piezoelectric cantilevers 3a-1 to 3a-4 and 3b-1 to 3b-4, each of the piezoelectric cantilever elements $E_Y$ and $E_Y'$ of the odd-numbered piezoelectric cantilevers 3a-1 and 3a-3; 3b-1 and 3b-3 is flexed in one direction, for example, in an upward direction, and each of the piezoelectric cantilever elements $E_Y$ and $E_Y'$ of the even-numbered piezoelectric cantilevers 3a-2 and 3a-4; 3b-2 and 3b-4 is flexed in a downward direction. In more detail, as illustrated in FIG. 7, the piezoelectric cantilevers 3a-1 is flexed in the upward direction with respect to the support body 2. Also, the piezoelectric cantilever 3a-2 is flexed in the downward direction with respect to the piezoelectric cantilever 3a-1. Further, the piezoelectric cantilever 3a-3 is flexed in the upward direction with respect to the piezoelectric cantilever 3a-2. Still further, the piezoelectric cantilever 3a-4 is flexed in the downward direction with respect to the piezoelectric cantilever 3a-3. Thus, the flexed amounts of the piezoelectric cantilevers 3a-1 to 3a-4 are accumulated, so that the piezoelectric actuator 3a is entirely flexed in the clockwise or counterclockwise direction with respect to the Y-axis. Similarly, the piezoelectric actuator 3b is entirely flexed in the clockwise or counterclockwise direction with respect to the Y-axis.

Figure 8A:
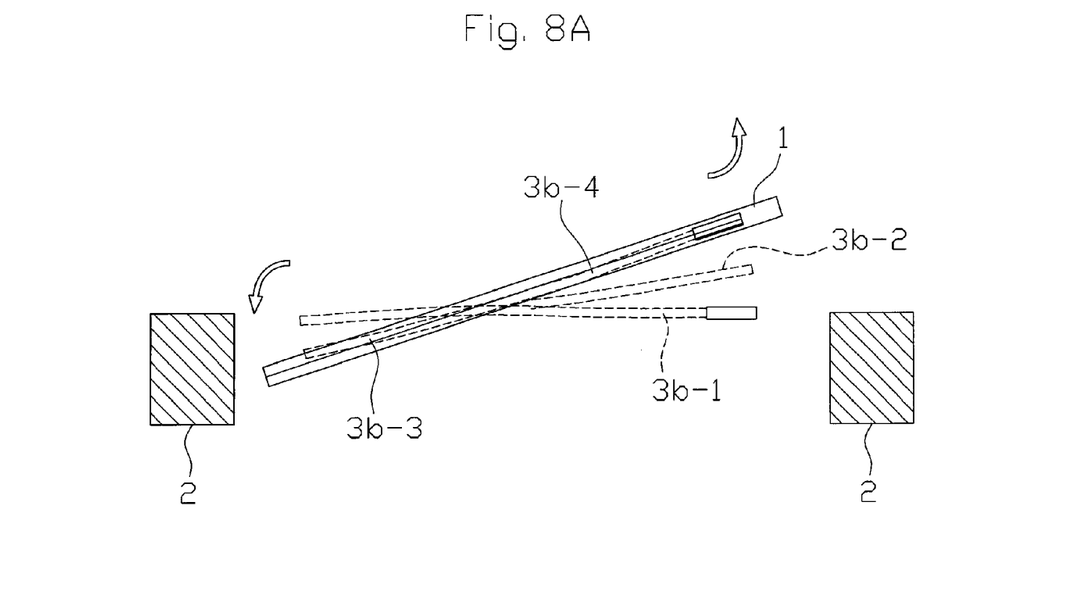
FIGS. 8A and 8B are a cross-sectional view and a perspective view, respectively, for explaining the rocking operation of the piezoelectric actuators along the Y-axis of FIG. 1.
Figure 8B:
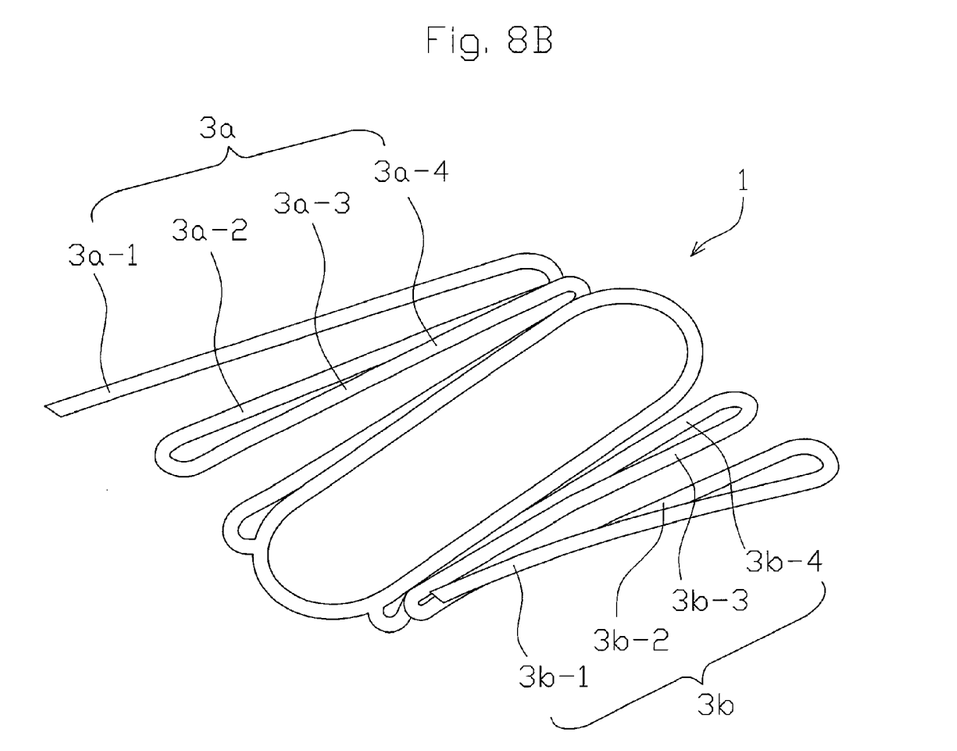

As illustrated in FIGS. 8A and 8B, when the piezoelectric actuator 3a is flexed in the clockwise or counterclockwise direction and the piezoelectric actuator 3b is flexed in the clockwise or counterclockwise direction, the mirror 1 is rocked in the clockwise or counterclockwise direction with respect to the Y-axis.

According to the first embodiment, when the drive voltages $V_{Xa}$ and $V_{Xb}$ were sinusoidal-waves having an amplitude of 20 V and a frequency of 2.1 kHz, the deflection angle $\theta_X$ was ±3°. Also, when the drive voltages $V_{Y1}$ and $V_{Y2}$ were sinusoidal-waves having an amplitude of 5 V and a frequency of 220 Hz, the deflection angle $\theta_X$ was ±15°. Also, when the drive voltages $V_{Y1}$ and $V_{Y2}$ were sinusoidal-waves having an amplitude of 5 V and a frequency of 220 Hz, the deflection angle $\theta_X$ was ±15°. Further, when the drive voltages $V_{Y1}$ and $V_{Y2}$ were DC voltages whose level changed at a frequency of 0 to 200 Hz, the deflection angle $\theta_X$ followed the changed DC voltages.

Figure 9:
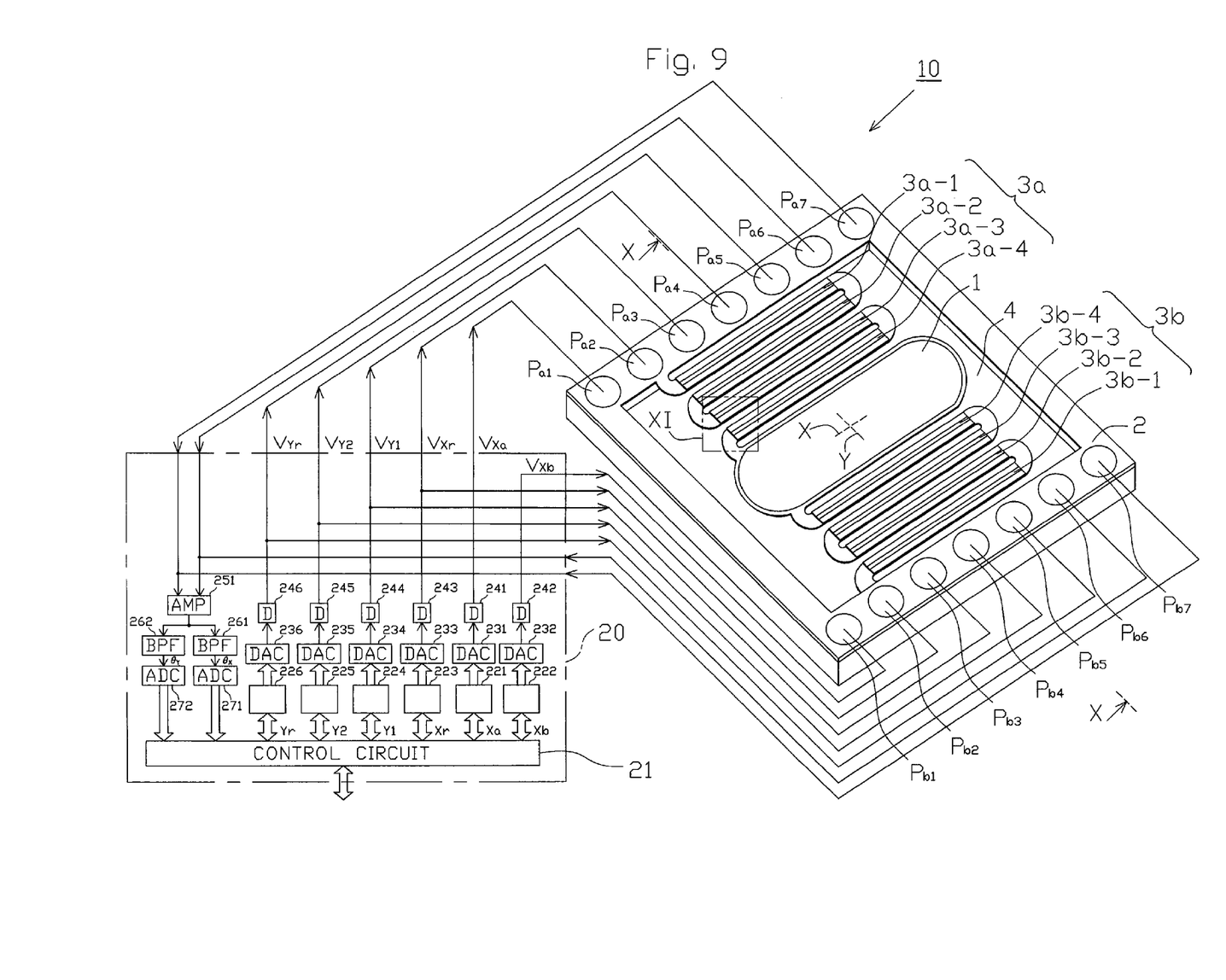
FIG. 9 is a view illustrating a second embodiment of the two-dimensional optical deflector according to the presently disclosed subject matter.
Figure 10:
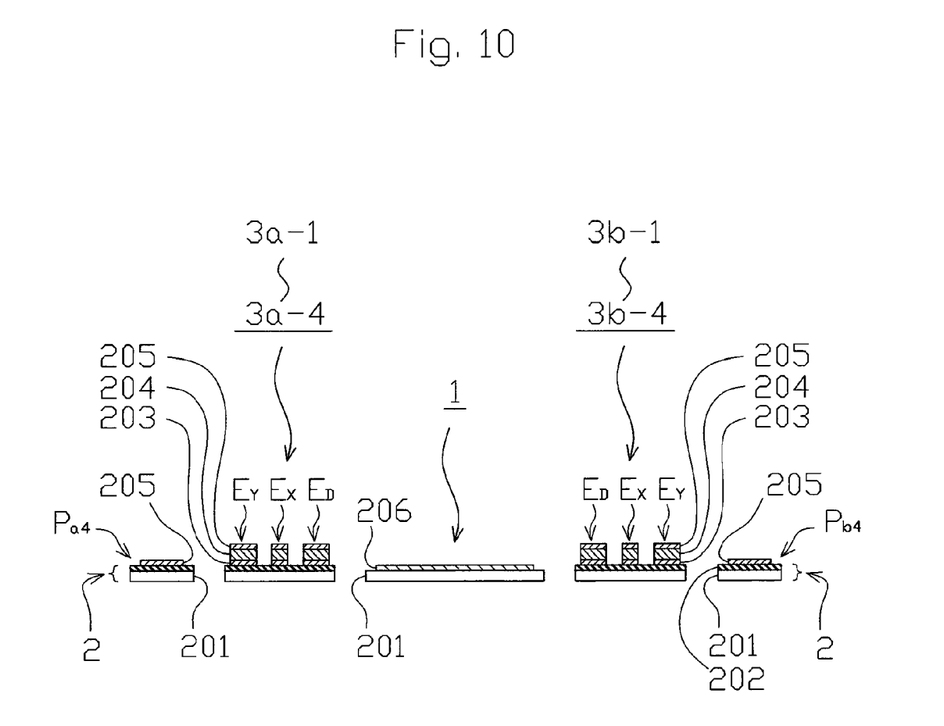
FIG. 10 is a cross-sectional view taken along the line X-X in FIG. 9.

FIG. 9 is a second embodiment of the two-dimensional optical deflector according to the present invention. FIG. 10 is a cross-sectional view taken along the line X-X in FIG. 9, and FIG. 11 is an enlarged perspective view of a portion surrounded by the line XI in FIG. 9.

Figure 11:
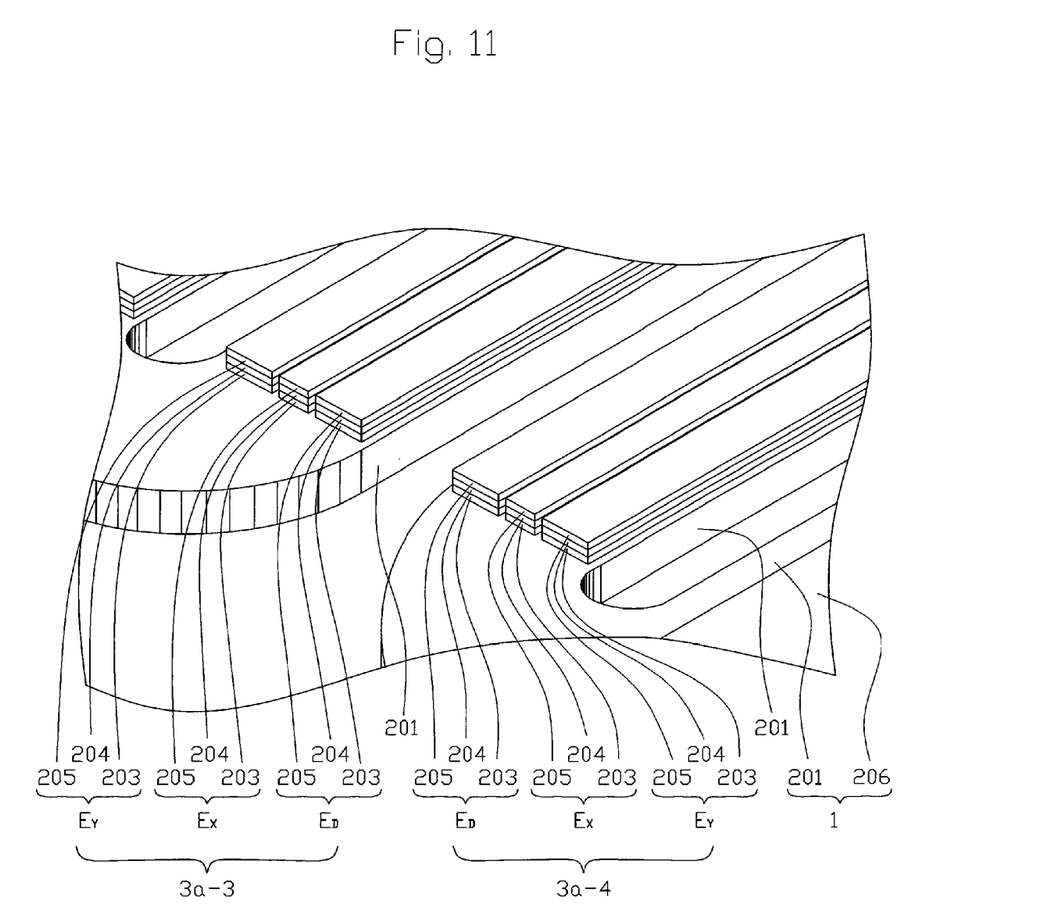
FIG. 11 is an enlarged perspective view of a portion surrounded by the line XI in FIG. 9.

In FIGS. 9, 10 and 11, in order to detect a deflection angle θ of the mirror 1, the piezoelectric cantilever element $E_Y'$ of FIGS. 1, 2 and 3 is replaced by a piezoelectric cantilever element $E_D$ which, however, has the same structure as the piezoelectric cantilever element $E_Y'$ of FIGS. 1, 2 and 3. Also, additional pads $P_{a6}$, $P_{a7}$, $P_{b6}$ and $P_{b7}$ are provided on the optical deflector 10. In this case, the pads $P_{a6}$ and $P_{b6}$ are called upper electrode pads, and the pads $P_{a7}$ and $P_{b7}$ are called lower electrode pads. Therefore, the upper electrode pads $P_{a6}$ and $P_{b6}$ are constructed by the upper electrode layers 205, and the lower electrode pads $P_{a7}$ and $P_{b7}$ are constructed by the lower electrode layers 203.

The upper electrode pad $P_{a6}$ is electrically connected to the upper electrode layers 205 of the piezoelectric cantilever elements $E_D$ of all the piezoelectric cantilevers 3a-1 to 3a-4, and the lower electrode pad $P_{a7}$ is electrically connected to the lower electrode layers 203 of the piezoelectric cantilever elements $E_D$ of all the piezoelectric cantilevers 3a-1 to 3a-4.

The upper electrode pad $P_{b6}$ is electrically connected to the upper electrode layers 205 of the piezoelectric cantilever elements $E_D$ of all the piezoelectric cantilevers 3b-1 to 3b-4, and the lower electrode pad $P_{b7}$ is electrically connected to the lower electrode layers 203 of the piezoelectric cantilever elements $E_D$ of all the piezoelectric cantilevers 3b-1 to 3b-4.

That is, when the two-dimensional optical deflector 10 is flexed, a polarization is generated in each of the PZT layer 204 of the piezoelectric cantilever elements $E_D$ due to the piezoelectric effect, so that potentials would be generated in the PZT layer 204, thus detecting the deflection angle θ of the mirror 1.

In FIG. 9, the driver 20 further includes a differential amplifier 251 for amplifying the potential in difference between the pads $P_{a6}$ and $P_{b6}$ and the pads $P_{a7}$ and $P_{b7}$, i.e., amplifying an analog deflection angle θ of the mirror 1. Also, the driver 20 includes a bandpass filter 261 for passing a predetermined frequency component including 2.5 kHz, for example, of the drive voltages $V_{Xa}$ and $V_{Xb}$ to obtain an analog X-axis deflection angle $\theta_X$ of the mirror 1 with respect to the X-axis, and a bandpass filter 262 for passing a predetermined frequency component including 60 Hz, for example, of the drive voltages $V_{Y1}$ and $V_{Y2}$ to obtain an analog Y-axis deflection angle $\theta_Y$ of the mirror 1 with respect to the Y-axis. Further, the driver 20 includes analog-to-digital (A/D) converters 271 and 272 for performing A/D conversions upon the analog X-axis deflection angle $\theta_X$ and the analog Y-axis deflection angle $\theta_Y$, respectively, to obtain a digital X-axis deflection angle and a digital Y-axis deflection angle which are supplied to the control circuit 21.

Thus, in the second embodiment, the control circuit 21 performs a feedback control upon the amplitude and frequency of the drive voltages $V_{Xa}$ and $V_{Xb}$ using the X-axis deflection angle $\theta_X$ in such a way that the X-axis deflection angle $\theta_X$ is brought close to an optimum value or a maximum value. Also, the control circuit 21 performs a feedback control upon the amplitude and frequency of the drive voltages $V_{Y1}$ and $V_{Y2}$ using the Y-axis deflection angle $\theta_Y$ in such a way that the Y-axis deflection angle $\theta_Y$ is brought close to an optimum value or a maximum value. Thus, a high accuracy two-dimensional optical deflector can be realized.

Figure 12:
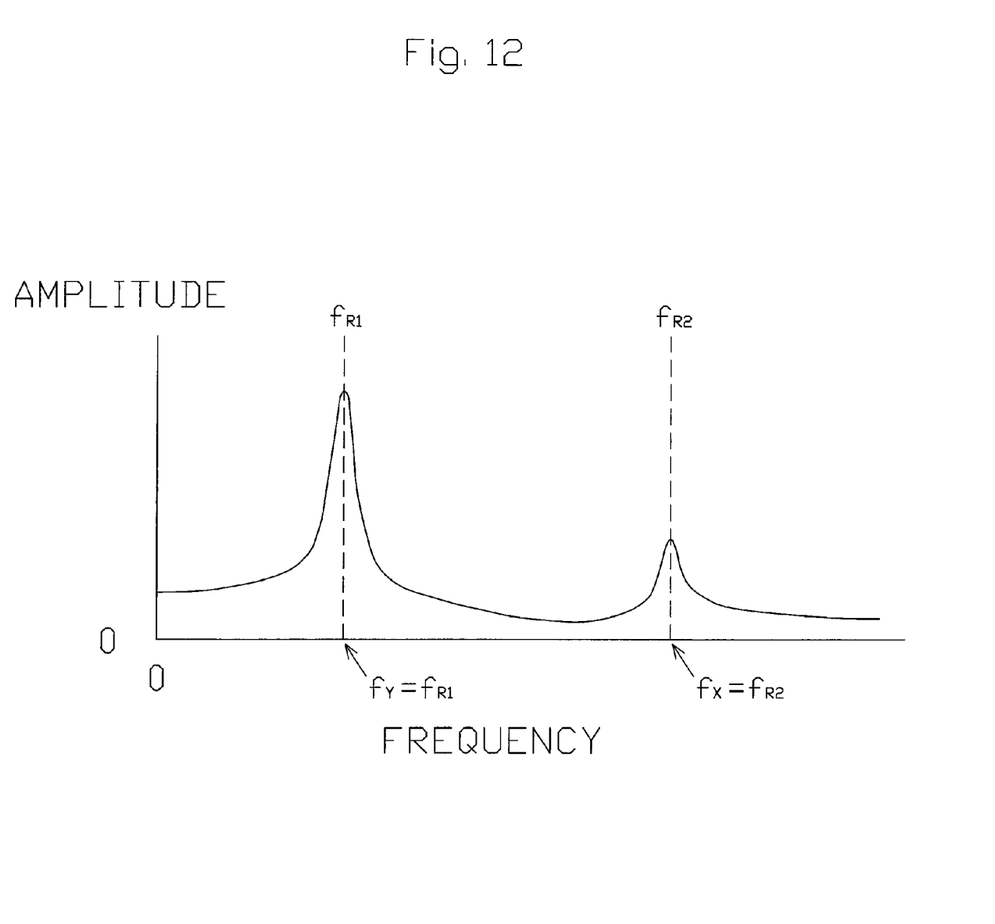
FIG. 12 is an experimentally-obtained frequency spectrum diagram of the mechanically-vibrating system of the mirror of FIGS. 1 and 9.

The rocking operation of the mirror 1 by the drive voltages $V_{Xa}$ and $V_{Xb}$ at the frequency $f_X$ with respect to the X-axis is more difficult than the rocking operation of the mirror 1 by the drive voltages $V_{Y1}$ and $V_{Y2}$ at the frequency $f_Y$ with respect to the Y-axis. In order to increase the X-axis deflection angle $\theta_X$, the frequency $f_X$ is made equal to a natural frequency such as $f_{R2}$ of a mechanically-vibrating system of the mirror 1 depending upon the piezoelectric actuators 3a and 3b, as illustrated in FIG. 12. As illustrated in FIG. 12, the frequency $f_Y$ is also made equal to another natural frequency $f_{R1}$ of the mechanically-vibrating system of the mirror 1 depending upon the piezoelectric actuators 3a and 3b. In this case, the natural frequencies $f_{R1}$ and $f_{R2}$ of the mechanically-vibrating system of the mirror 1 depend upon the modules of direct elasticity, the thickness, the density, the length, the number of piezoelectric cantilevers, and so on of the piezoelectric actuators 3a and 3b. When the frequency $f_X$ (=$f_{R2}$) is ten times or more the frequency $f_Y$ (=$f_{R1}$), the rocking operation at the frequency $f_X$ (=$f_{R2}$) with respect to the X-axis and the rocking operation at the frequency $f_Y$ with respect to the Y-axis would not affect each other. Note that the above-described feedback control using the detected deflection angles $\theta_X$ and $\theta_Y$ from the pads $P_{a6}$, $P_{a7}$, $P_{b6}$ and $P_{b7}$ can make the frequencies $f_X$ and $f_Y$ equal to the natural frequencies $f_{R2}$ and $f_{R1}$, respectively.

Figure 13:
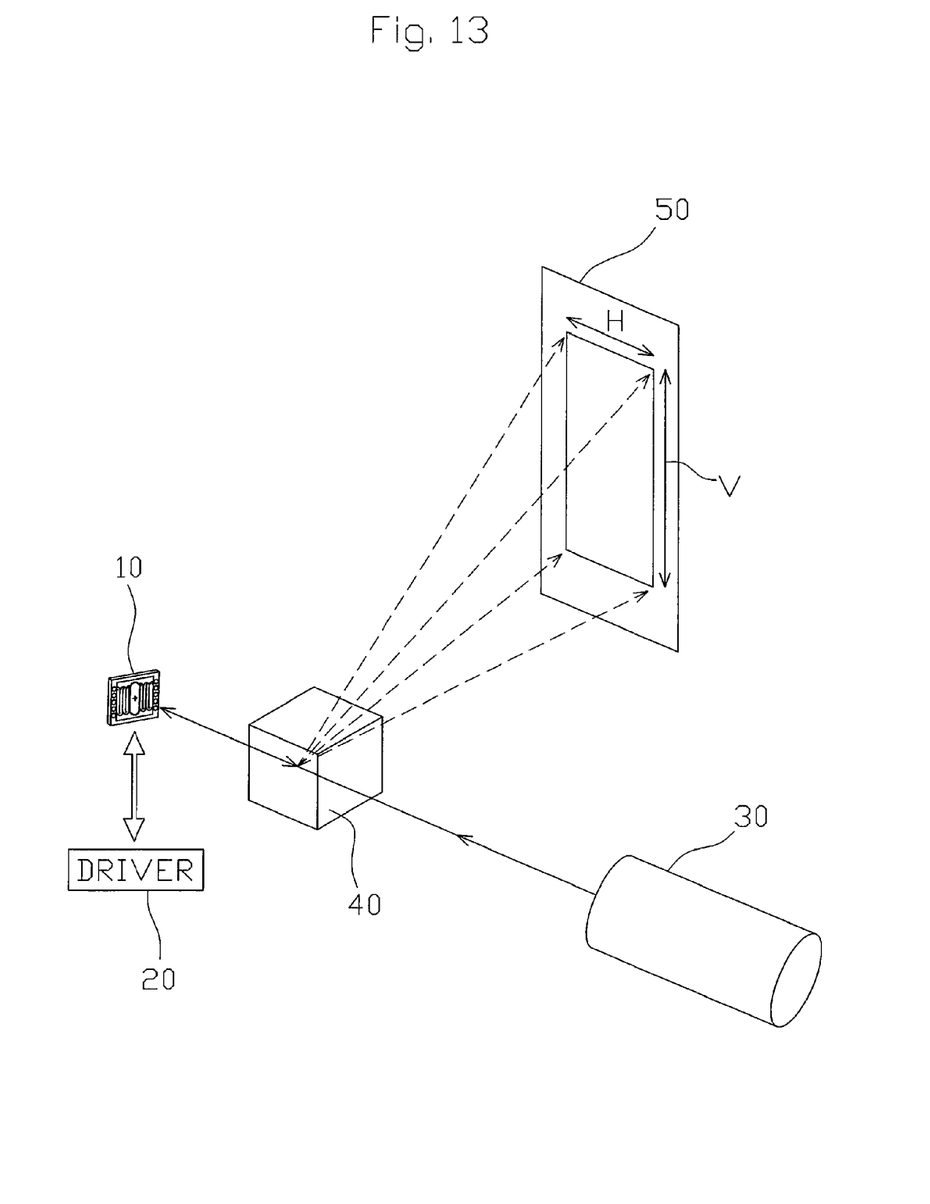
FIG. 13 is a diagram illustrating an image display apparatus to which the two-dimensional optical deflector and its driver of FIG. 1 or 9 is applied.

In FIG. 13, the two-dimensional optical deflector of FIG. 1 or FIG. 9 is applied to an image display apparatus. This image display apparatus is constructed by the two-dimensional optical deflector 10 and the driver 20 of FIG. 1 or FIG. 9, a laser source 30, a half mirror (beam splitter) 40 and a screen 50. In this case, the laser source 30, the half mirror 40 and the screen 50 are fixed at predetermined locations. Light outputted from the laser source 30 is modulated and passes through condensing lenses (not shown) and then, through the half mirror 40 to reach the mirror of the optical deflector 10. Then, light reflected by the mirror of the optical deflector 10 is deflected by the deflection angle θ of the mirror thereof and is split at the half mirror 40 to project on the screen 50. Light reflected the optical deflector 10 is raster-scanned so that the screen 50 is scanned with the light in a horizontal direction H and in a vertical direction V as indicated within the screen 50.

The two-dimensional optical deflector according to the presently disclosed subject matter can be applied to a light scanner such as an electronic photo type printer and a laser printer, a sensing light scanner such as a laser radar, a bar code reader, an area sensor or a touch panel in addition to the image display apparatus of FIG. 13.

In the above-described embodiments, although the pads $P_{a4}$ and $P_{b4}$ are common to the lower electrode layers 203 of the odd-numbered piezoelectric cantilevers and the even-numbered piezoelectric cantilevers, these pads can be provided for the odd-numbered piezoelectric cantilevers and the even-numbered piezoelectric cantilevers, separately.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A two-dimensional optical deflector comprising:
a mirror;
a support body surrounding said mirror;
first and second piezoelectric actuators of a meander-type provided opposite to each other with respect to a first axis of said mirror;
each of said first and second piezoelectric actuators comprising a plurality of piezoelectric cantilevers folded at every cantilever and connected from said support body to said mirror, each of said piezoelectric cantilevers being in parallel with said first axis,
each of said piezoelectric cantilevers including first and second piezoelectric cantilever elements in parallel with each other combined by a substrate, said second piezoelectric cantilever elements being divided into a first group of piezoelectric cantilever elements and a second group of piezoelectric cantilever elements alternating with said first group of piezoelectric cantilever elements,
said first piezoelectric cantilever elements of said first piezoelectric actuator and said first piezoelectric cantilever elements of said second piezoelectric actuator being configured to be driven by first and second drive voltages, respectively, opposite in phase with each other to rock said mirror with respect to said first axis,
said first groups of piezoelectric cantilever elements and said second groups of piezoelectric cantilever elements being configured to be driven by third and fourth drive voltages, respectively, opposite in phase with each other to rock said mirror with respect to a second axis of said mirror perpendicular to said first axis.

2. The two-dimensional optical deflector as set forth in claim 1, wherein each of said first and second piezoelectric cantilever elements is constructed by a piezoelectric layer sandwiched by a lower electrode layer and an upper electrode layer.

3. The two-dimensional optical deflector as set forth in claim 1, further comprising:
a first electrode electrically connected to said first piezoelectric cantilever elements of said first piezoelectric actuator;
a second electrode electrically connected to said first piezoelectric cantilever elements of said second piezoelectric actuator;
a third electrode electrically connected to said first group of piezoelectric cantilever elements of said first piezoelectric actuator;
a fourth electrode electrically connected to said second group of piezoelectric cantilever elements of said first piezoelectric actuator;
a fifth electrode electrically connected to said first group of piezoelectric cantilever elements of said second piezoelectric actuator; and
a sixth electrode electrically connected to said second group of piezoelectric cantilever elements of said second piezoelectric actuator.

4. The two-dimensional optical deflector as set forth in claim 1, wherein each of said piezoelectric cantilevers further includes a third piezoelectric cantilever element combined by said substrate in parallel with said first and second piezoelectric cantilever elements, said third piezoelectric cantilever elements being configured to detect a deflection angle of said mirror.

5. The two-dimensional optical deflector as set forth in claim 4, wherein said third piezoelectric cantilever element includes a piezoelectric layer sandwiched by a lower electrode layer and an upper electrode layer combined by said substrate.

6. The two-dimensional optical deflector as set forth in claim 4, further comprising:
a seventh electrode electrically connected to said third piezoelectric cantilever elements of said first piezoelectric actuator; and
an eighth electrode electrically connected to said third piezoelectric cantilever elements of said second piezoelectric actuator.

7. A driver for driving a two-dimensional optical deflector, said optical deflector comprising:
a mirror;
a support body surrounding said mirror;
first and second piezoelectric actuators of a meander-type provided opposite to each other with respect to a first axis of said mirror;
each of said first and second piezoelectric actuators comprising a plurality of piezoelectric cantilevers folded at every cantilever and connected from said support body to said mirror, each of said piezoelectric cantilevers being in parallel with said first axis,
each of said piezoelectric cantilevers including first and second piezoelectric cantilever elements in parallel with each other combined by a substrate, said second piezoelectric cantilever elements being divided into a first group of piezoelectric cantilever elements and a second group of piezoelectric cantilever elements alternating with said first group of piezoelectric cantilever elements,
said driver generating first and second drive voltages opposite in phase to each other and applying said first and second drive voltages to said first piezoelectric cantilever elements of said first piezoelectric actuator and said first piezoelectric cantilever elements of said second piezoelectric actuator, respectively, to rock said mirror with respect to said first axis, said driver further generating third and fourth drive voltages opposite in phase to each other and applying said third and fourth drive voltages to said first groups of piezoelectric, cantilever elements and said second groups of piezoelectric cantilever elements, respectively, to rock said mirror with respect to a second axis of said mirror perpendicular to said first axis.

8. The driver as set forth in claim 7, wherein a frequency of said first and second drive voltages resonates with a natural frequency of a mechanically-vibrating system of said mirror depending upon said piezoelectric actuators, and a frequency of said third and fourth drive voltages resonates with another natural frequency of said mechanically-vibrating system.

9. The driver as set forth in claim 7, wherein each of said piezoelectric cantilevers further includes a third piezoelectric cantilever element combined by said substrate in parallel with said first and second piezoelectric cantilever elements, said driver performing a feedback control using a deflection angle of said mirror from said third piezoelectric cantilever elements based upon amplitudes and frequencies of said first, second, third and fourth drive voltages in such a way that said deflection angle is brought close to a predetermined value.

10. The driver as set forth in claim 9, comprising:

a first bandpass filter for passing a first predetermined frequency component of a detection signal from said third piezoelectric cantilever elements;

a second bandpass filter for passing a second predetermined frequency component of said detection signal from said third piezoelectric cantilever elements;

said feedback control being carried out in accordance with said first predetermined frequency component of said first bandpass filter in such a way that an amplitude and frequency of said first and second drive voltages are brought close to predetermined values, said feedback control being carried out in accordance with said second predetermined frequency component of said second bandpass filter in such a way that an amplitude and frequency of said first and second drive voltages are brought close to predetermined values.

* * * * *